United States Patent

[11] 3,574,356

| [72] | Inventors | Phillip Salerno<br>720 Avenue W, Brooklyn, N.Y. 11234;<br>Michael Sammaritano, 910 Manor Lane,<br>Bayshore, N.Y. 11706 |
|---|---|---|
| [21] | Appl. No. | 808,452 |
| [22] | Filed | Mar. 19, 1969 |
| [45] | Patented | Apr. 13, 1971 |

[54] PREFORMED CONDUIT
4 Claims, 8 Drawing Figs.

[52] U.S. Cl. .................................................. 285/39,
138/111, 138/117, 285/137, 285/288
[51] Int. Cl. ....................................................... F16l 35/00,
F16l 55/00
[50] Field of Search .......................................... 138/106,
107, 108, 111, 112, 113, 115, 155, 162, 117;
285/39, 137, 288

[56] References Cited
UNITED STATES PATENTS

| 1,120,471 | 12/1914 | Franklin ........................ | 138/155X |
| 1,293,163 | 2/1919 | Mitchell et al. ................. | 138/106 |
| 1,520,840 | 12/1924 | Murray .......................... | 138/111X |
| 1,525,087 | 2/1925 | Murray .......................... | 138/108X |
| 1,722,369 | 7/1929 | DeLaMare .................... | 138/106X |
| 2,670,762 | 3/1954 | Stivason ....................... | 138/107 |
| 2,906,294 | 9/1959 | Peterson ....................... | 138/106X |
| 3,163,448 | 12/1964 | Franklin ........................ | 138/112X |
| 2,571,578 | 10/1951 | VanderMaelen ............. | 138/109 |

*Primary Examiner*—Herbert F. Ross
*Attorney*—Frank J. Jordan

ABSTRACT: A preformed conduit for underground cables, electrical wires and the like consists of a plurality of pipes encased within an elongated concrete body which is formed by pouring concrete around said plurality of pipes as the latter are supported in parallel, spaced relationship. Reinforcing means comprising longitudinally and transversely extending members are preassembled in place before the concrete is poured therearound. To facilitate joining the longitudinal ends of two like conduit sections, a plurality of coupling means are embedded in said concrete body. Accordingly, a plurality of said conduit sections may be joined to one another to form a continuous conduit in which various cables, electrical wires and the like may be carried in the pipes of the conduit sections.

PATENTED APR 13 1971
3,574,356
SHEET 1 OF 2
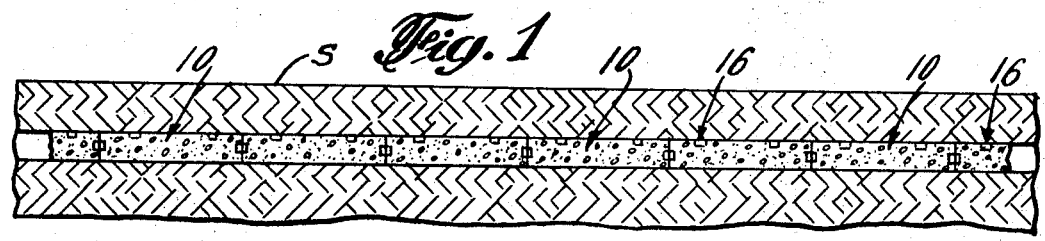
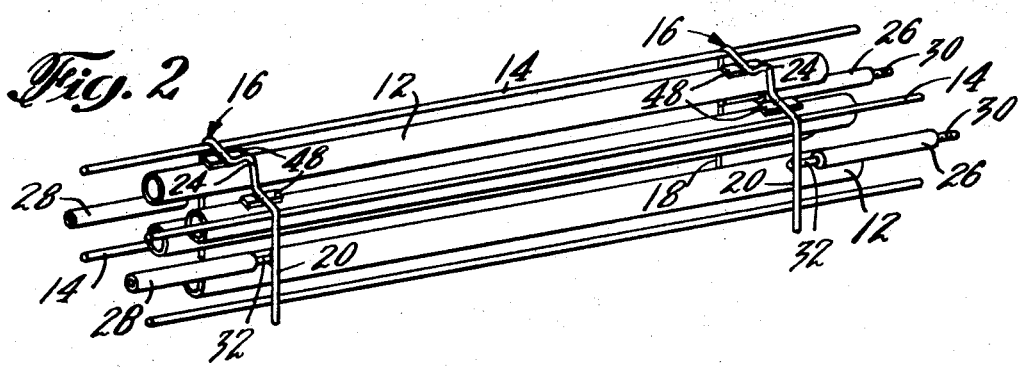
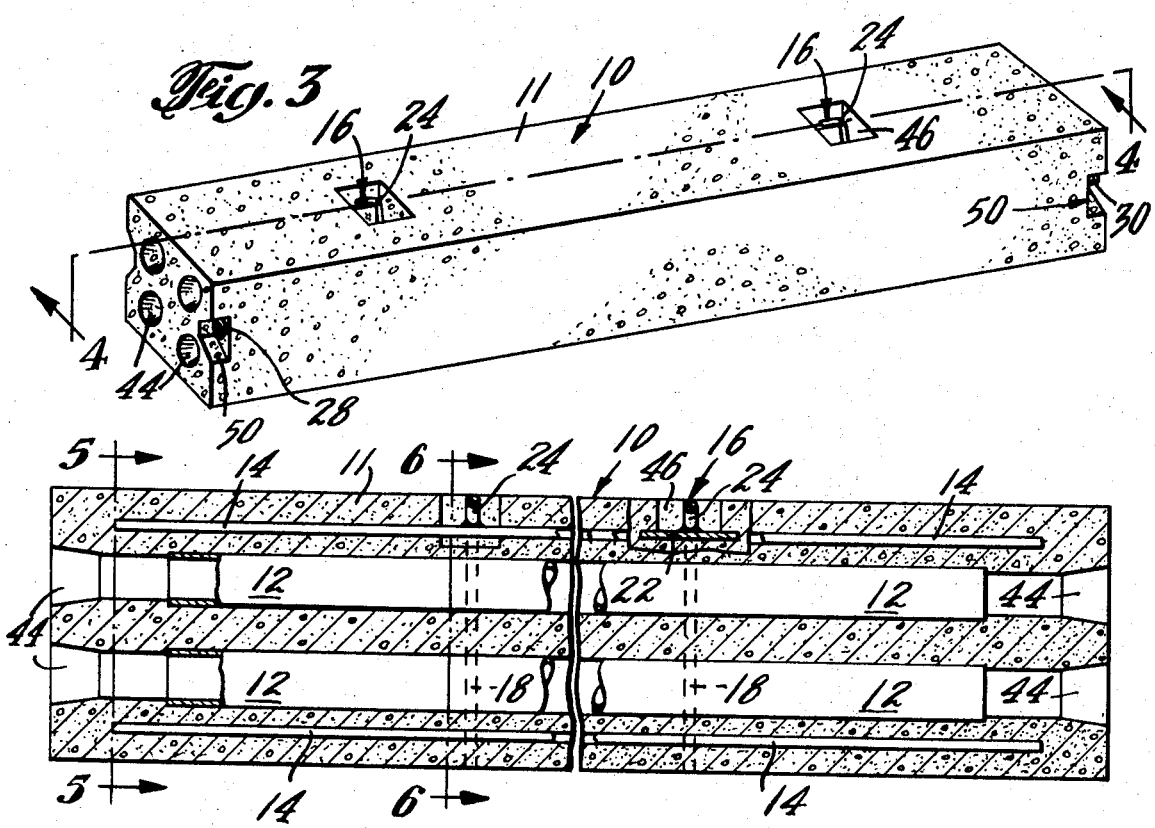
INVENTORS
PHILLIP SALERNO
MICHAEL SAMMARITANO
BY Frank J. Jordan
ATTORNEY

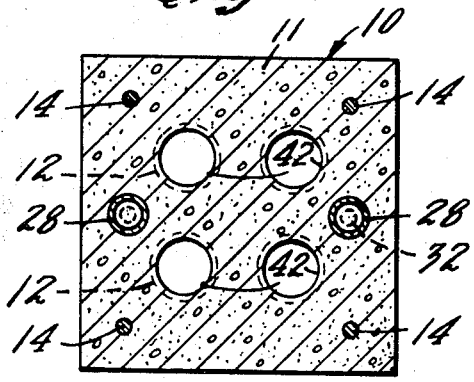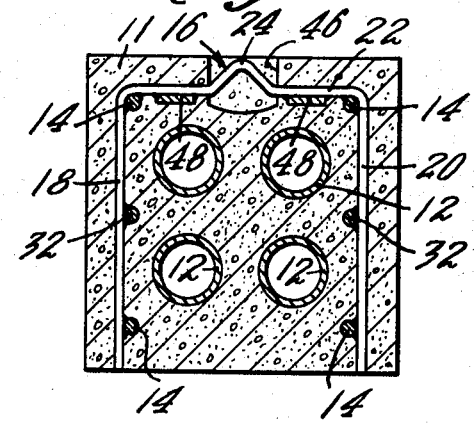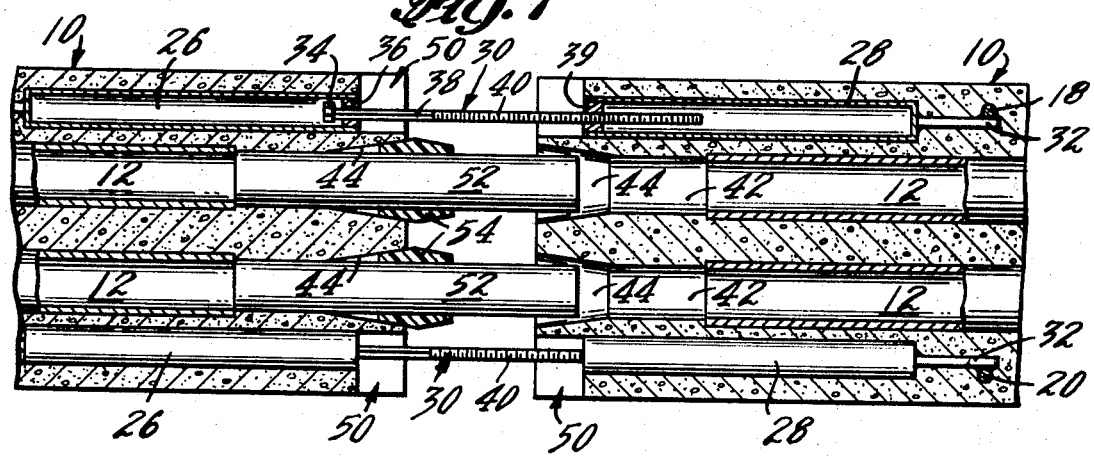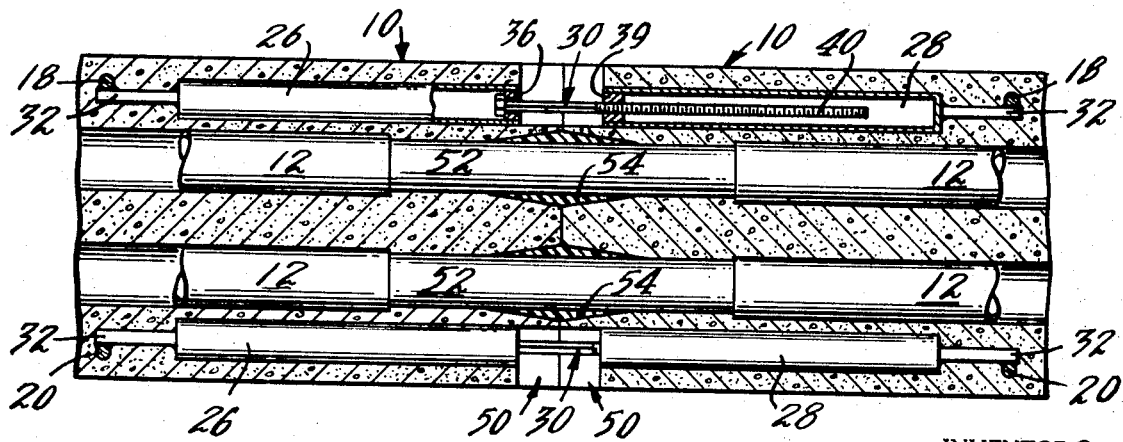
INVENTORS
PHILLIP SALERNO
MICHAEL SAMMARITANO
BY Frank J. Jordan
ATTORNEY

PREFORMED CONDUIT

SUMMARY OF THE INVENTION

A preformed conduit for under ground cables, electrical wires and the like consists of a plurality of pipes encased within an elongated concrete body. Reinforcing means are included in the concrete and coupling devices are embedded in the longitudinal ends of the concrete body to facilitate coupling two like conduit sections together whereby a plurality of said sections may be joined to one another to form a continuous conduit in which various cables, electrical wires and the like may be carried in the pipes of the conduit sections.

BRIEF DESCRIPTION OF THE DRAWING

FIG. 1 is an elevational view of a plurality of preformed conduit sections joined to one another and located underground.

FIG. 2 is a perspective view on a larger scale of the various parts in a preformed conduit section before the concrete is poured to form the complete conduit section.

FIG. 3 is a perspective view of a complete preformed conduit section after the concrete has been poured.

FIG. 4 is a sectional view looking substantially along the line 4—4 of FIG. 3 and showing a longitudinal central section of the conduit section.

FIG. 5 is a sectional view looking substantially along the line 5—5 of FIG. 4 showing a transverse section near the longitudinal end of the conduit section.

FIG. 6 is a sectional view looking substantially along the line 6—6 of FIG. 4 showing a transverse section adjacent the lifting hook.

FIG. 7 is a partial, horizontal longitudinal section showing the ends of two conduit sections in a preassembled condition just before they are joined to one another.

FIG. 8 is a partial, horizontal, longitudinal section similar to FIG. 7 but showing the two conduit sections after they have been joined.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed is for the purpose of description and not of limitation.

Referring to the drawings in which like parts are similarly designated, FIG. 1 shows a plurality of preformed conduit sections, each section being designated generally by the numeral 10, located underground, the surface of the ground being designated S. Each of the conduit sections 10 are joined to one another at their longitudinal ends to form a continuous, uninterrupted conduit. The conduit sections 10 may be used in various applications where it is desired to lay underground cables or wires. They may be used, for example, at airports for carrying electrical wires and cables to various buildings, communication centers, and flight control locations.

Turning to a more detailed description, FIG. 2 shows the relative location of the parts before the concrete 11 is poured to form the completed conduit section 10, shown in FIG. 3. Each conduit section 10 comprises a plurality of pipes 12 (four are shown in the illustrated embodiment) which extend parallel to one another but which are spaced from one another so that each pipe may be completely surrounded by concrete 11. Each section 10 also includes reinforcing rods 14 and lifting hooks 16. Although there are four reinforcing rods 14 shown in the drawings, it will be understood any number of such rods may be used as required. Similarly, any number of lifting hooks 16 may be used depending on the size of the conduit section. The rods 14 and hooks 16 may be make of iron, steel, or other metal of comparable strength.

Each lifting hook 16 is formed as an inverted U having two vertical legs 18 and 20 joined to a crossbar 22, the latter having a protruding or bent central section 24 which is exposed and not covered with concrete 11 as will be explained. The two hooks 16 are spaced from one another and the reinforcing rods 16 extend therebetween to define the structure shown in FIG. 2. Thus, it will be seen that the two upper reinforcing rods 14 engage the lifting hook 16 at the right-angle corner of the latter while the two lower rods 14 engage the lower end of the two legs 18 and 22. This relationship can best be seen in FIG. 6. The rods 14 are suitably affixed to the hooks 16 at the aforementioned locations of engagement. This may be accomplished, for example, by welding. The terminal ends of the legs 18, 20 may extend to the bottom surface of the concrete whereby said legs support the preassembled reinforcing structure on the bottom of the form in which the concrete is poured.

Further included as part of the structure which is formed before the concrete 11 is poured, are a plurality of coupling means which are utilized to join two conduit sections together as will be explained. The coupling means comprise hollow inserts 26 and 28 each of which may be in the form of a length of hollow pipe. Each insert 26, 28 is adapted to accommodate part of a coupling bolt 30 which secures two conduit sections together. As can best be determined from FIG. 2, each conduit section is provided with four coupling inserts (two designated 26 and two designated 28), however, any number may be provided as desired. Each coupling insert 26, 28 is supported in its desired position by a support rod 32 which extends longitudinally of the conduit section to connect the coupling insert to the adjacent lifting hook 16. The ends of the support rod 32 are affixed to the hook 16 and to the longitudinal end of the coupling inserts 26 or 28 by suitable means, for example, by welding. It will be seen that the support rods 32 hold the coupling inserts in the position shown in FIG. 2 when the concrete 11 is poured therearound. The longitudinal ends of the coupling inserts 26, 28 to which the support rods 32 are joined are closed whereas the other longitudinal end has openings, to be further described, to receive the coupling bolts 30.

The bolts 30 are disposed in the coupling inserts 26 when the concrete 11 is poured. In the preassembled unit shown in FIG. 2, the conduit inserts 26 with the loosely held bolts 30 therein are in the position they will occupy when the concrete 11 is poured.

It will be observed that the pipes 12 are not affixed to the hooks 16 or rods 14. Accordingly, when the concrete is poured, these pipes 12 are supported in the position shown in FIG. 2 by suitably support mandrels (not shown) inserted into the ends of each pipe 12. It will be noted in the drawings that the pipes 12 do not extend all the way to the longitudinal end of the concrete 11. Accordingly the support mandrels will have a plug portion which fits into the end of the pipes 12 and another portion which defines a core for forming directly in the concrete, extensions 42 to the pipes 12. The ends of the extensions 42 are frustoconical as indicated at 44 for reasons to be explained. The support mandrels are, of course, removed from position after the concrete 11 is poured and are reused for making additional conduit sections. Removal is effected by sliding the support mandrel longitudinally out of position.

After the unit has been preassembled as shown in FIG. 2 with the pipes 12, supported in the position shown by the support mandrels, a form for the concrete 11 is disposed about the assembly. The form has a configuration corresponding to the configuration of the concrete shown in FIGS. 3 to 8. Thus, the form has provision to form indentations 46 about the central portion 24 of each hook 16 whereby said central portion 24 is exposed and accessible to receive a lifting hook or the like from a crane or other lifting device. In order to reinforce the hook 16 in the area of the indentations 46, suitable plates 48 may be welded to the underside of the crossbar 22 of the hook 16. It will be apparent that the plates 48 serve to anchor the crossbar 22 securely to the concrete 11 in the area adjacent to where the hook protrudes out of the concrete 11.

The form for the concrete 11 also has provisions to form access indentations 50 adjacent to the coupling bolts 30 to receive a wrench or the like to facilitate tightening and loosening of the later. There is an access indentation 50 adjacent to each coupling insert 26, 28 and the configuration of such indentations 50 can be seen in the drawings.

Two conduit sections 10 are assembled as shown in FIGS. 7 and 8, wherein connecting sleeves 52 and gaskets 54 are utilized to effect the assembly. The connecting sleeves 52 are inserted in each of the extension 42 of one of the conduit sections to be joined and a ring gasket 54 is placed around each connecting sleeve 52. The ring gasket 52 may have two back-to-back frustoconical sections as shown to fit into the frustoconical sections 44 on the end of the pipe extensions 42. The gaskets 52 may be made of wax, synthetic rubber, plastic, hemp, cork, or other similar material.

In the preassembly shown in FIG. 7, the bolts 30 are partially threaded on the nuts 38. It will be apparent that the bolts 30 may be easily grasped manually and threadedly engaged onto the nuts 38 because there is sufficient access space between the two conduit sections and further, the access indentations 50 provide additional space. To facilitate turning of the bolts 30, the shank 38 if formed with a polygonal, e.g. hexagonal, cross section. Accordingly, an open end wrench may be readily applied anywhere along the longitudinal extent of the shank to turn the bolt 30. By comparing FIGS. 7 and 8 it will be seen that as the bolts 30 are turned on the nuts 38, the two conduit sections will be drawn together until the concrete ends abut one another. As this occurs, the soft gaskets 54 are squeezed to conform to the shape of the frustoconical portions on the ends of the concrete pipe extensions 42, thereby to form a tight seal. Thus the longitudinally aligned pipes 12 are joined to one another by the connecting sleeves 52 and sealed by the compressed gasket rings 54.

It will be seen that the coupling inserts 28 are long enough to accommodate the complete threaded end of the bolts 30. Also as can best be seen in FIG. 8, wrench access to the shanks 38 of the bolts may still be had after the two conduit sections are joined to one another by virtue of the access indentations 50 in the concrete. The two joined conduit sections, may be disassembled as may be required merely by loosening the bolts 30 and separating the two conduit sections.

In addition to holding the coupling inserts 26, 28 in place when the concrete is poured, as previously explained, the support rods 32 also serve to anchor the coupling inserts 26, 28 to the hooks 16 so that the coupling inserts 26, 28 will not be pulled out of the concrete when the bolts 30 are tightened. Alternatively, the coupling inserts 26, 28 may have corrugations to facilitate anchorage in the concrete. Also, as may be desired, the support rods 32 may be dispensed with and the coupling inserts 26, 28 may long enough to contact the hooks 16 and be welded or otherwise secured thereto.

It will be understood that although four pipes 12 are shown in the drawings, any number of pipes may be used. Also instead of being squared as illustrated, the cross section of the concrete may be circular or take on some other configuration. The pipes 12 may be made of fiberglass, plastic, fibrous compounds, metal, or other suitable material.

The conduit sections may be made of standard lengths but shorter lengths may be made to fill in shorter spaces, for example, between a manhole and the end of a conduit section leading thereto. It will be apparent that use of the conduit sections herein described eliminates the necessity of having to pour concrete in the field when the cable or electrical wires are being laid. The conduit sections may be made in a factory and stored until ready for use. When they are used, it is only necessary to dig a ditch, lay the conduit sections therein, and couple them as previously explained.

It is thought that the invention and many of its attendant advantages will be understood from the foregoing description and it will be apparent that various changes may be made in the form, construction and arrangement of parts of the apparatus mentioned herein and in the steps and their order of accomplishment of the process (method) described herein, without departing from the spirit and scope of the invention or sacrificing all of its material advantages, the apparatus and process hereinbefore described being merely a preferred embodiment thereof.

We claim:

1. A preformed conduit for cables, electrical wires and the like, comprising a longitudinal extending concrete body having a plurality of longitudinal passages therein, a pipe within each of said passages, each of said pipes terminating short of the longitudinal ends of said concrete body, each of said passages having a longitudinal end portion extending from the longitudinal end of said concrete body to the adjacent longitudinal end of the pipe within the respective passage, each of said passage end portions having a generally cylindrical section and a generally conical section and being adapted to receive a cylindrical coupling member which abuts the longitudinal end of the pipe in the respective passage, said conical section being adapted to receive a generally frustoconical sealing member which is accommodated on the outside of said coupling member, coupling means within said concrete body operable to cooperate with another like concrete body to urge two like bodies longitudinally towards one another in abutting relationship, said coupling means comprising longitudinally extending hollow pipe elements embedded in said concrete body, the pipe elements on one longitudinal end of said concrete body having the head of a bolt loosely fitted therein, the pipe elements on the other longitudinal end having a threaded member adapted to threadedly engage said bolt, said pipe element on said one longitudinal end of said concrete body including a retaining member to hold the bolt in said pipe element, said pipe element being of sufficient longitudinal length to accommodate the major portion of the bolt whereby the bolt may be accommodated therein during shipment and handling of the concrete body, said bolts having a longitudinally extending shank with a polygonal cross-sectional configuration, said concrete body being provided with means defining indentations to provide access for a wrench or the like to said polygonal cross-sectional shank to turn said bolts until the longitudinal ends of two like concrete bodies abut one another, whereby said sealing members are compressed to effect a seal between the longitudinal ends of aligned passages of two like concrete bodies.

2. A preformed conduit according to claim 1 wherein said concrete body is defined by a plurality of walls defining an outer boundary for said concrete body, said outer boundary being parallel to the longitudinal axis of the concrete body, said coupling means being confined within the outline of said outer boundary.

3. A preformed conduit as set forth in claim 1 wherein said concrete body is defined by a least one outer boundary wall parallel to the longitudinal axis of the concrete body throughout the longitudinal extent of the concrete body.

4. A preformed conduit as set forth in claim 3 wherein hook means are provided on said concrete body to facilitate lifting and handling thereof, said concrete body having another outer boundary wall with means therein defining an indentation, said hook means comprising a member projecting into said indentation in said concrete body whereby said member is confined within said outer boundary wall.